Feb. 18, 1930.　　　N. L. OATES ET AL　　　1,747,593
CAN WEIGHING MACHINE
Filed Dec. 7, 1927　　　7 Sheets-Sheet 1
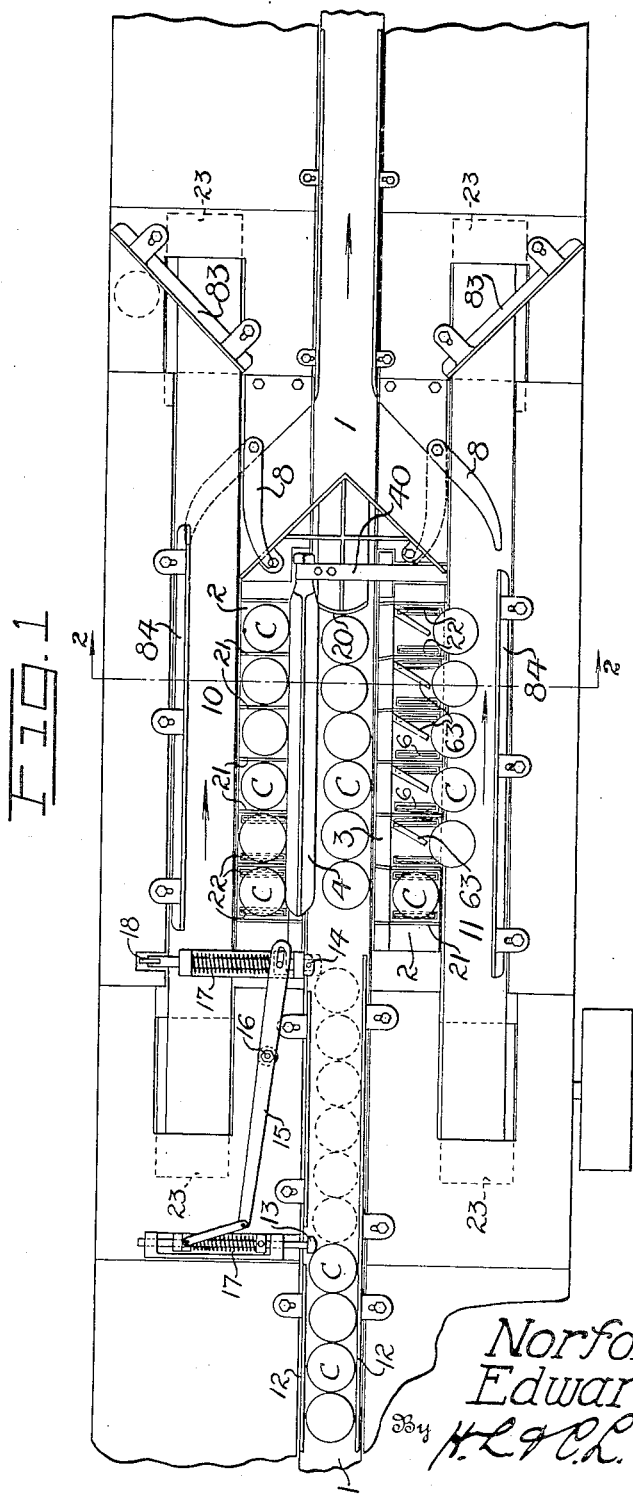
Inventor
Norford L. Oates
Edward H. Waugh
By H.L.&C.L. Reynolds,
Attorneys

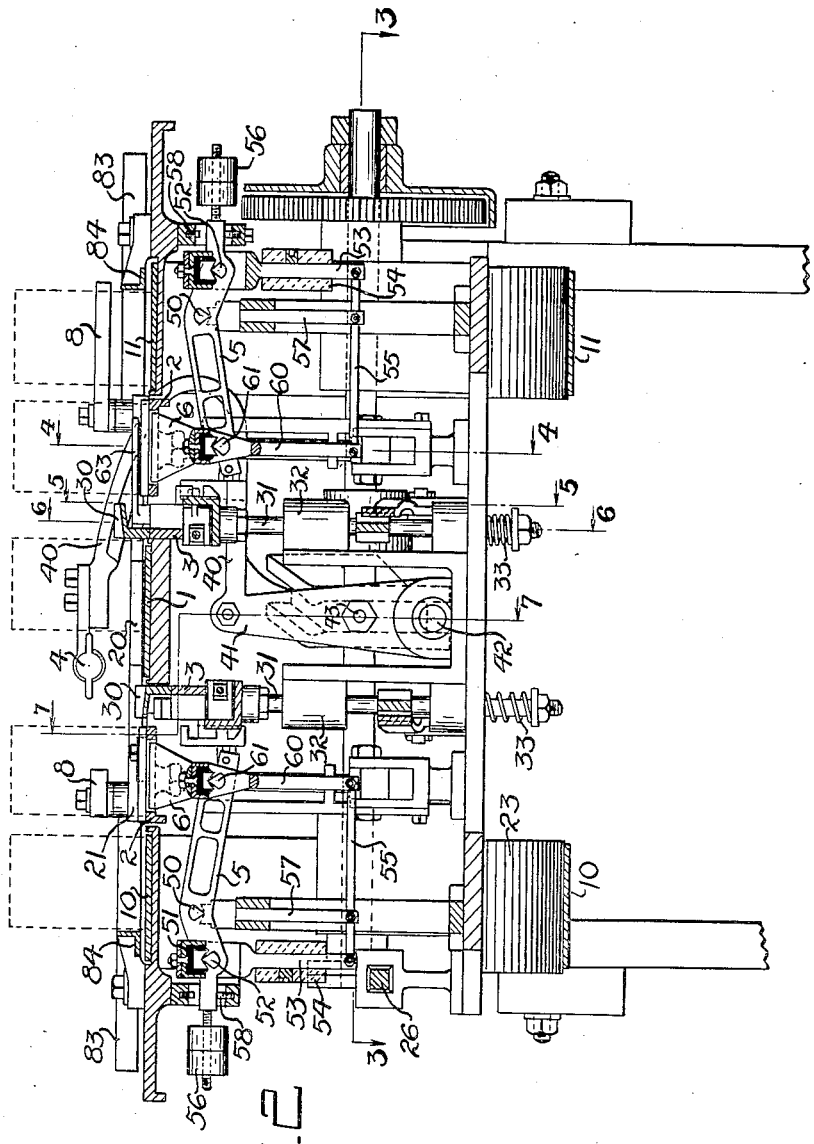

Feb. 18, 1930.    N. L. OATES ET AL    1,747,593
CAN WEIGHING MACHINE
Filed Dec. 7, 1927    7 Sheets-Sheet 3
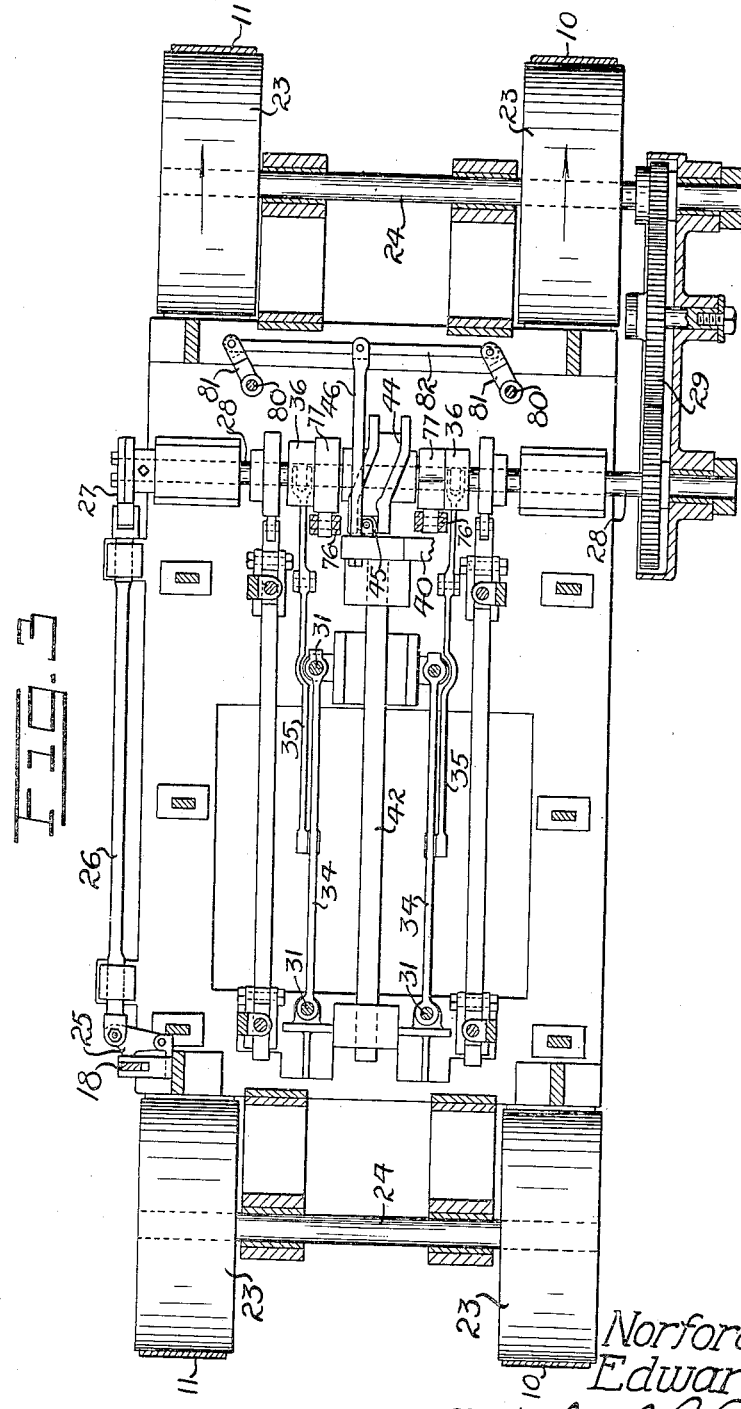
Inventor
Norford L. Oates
Edward H. Waugh
By H.L. & C.L. Reynolds
Attorneys

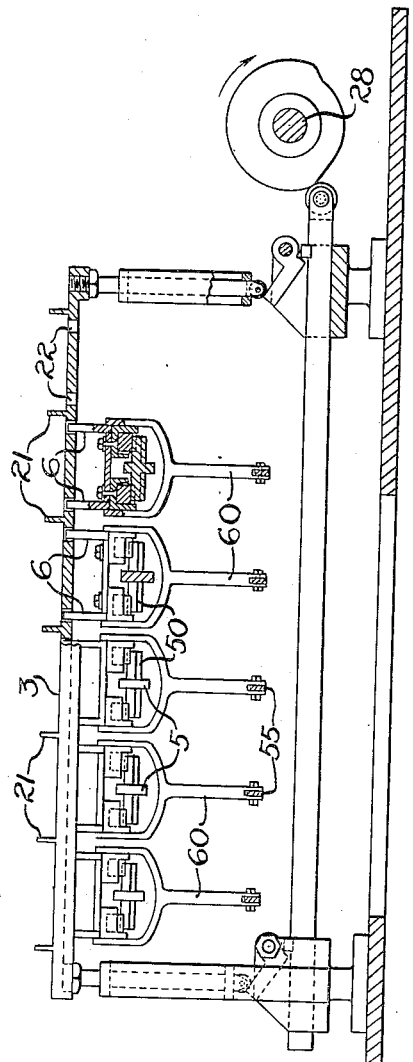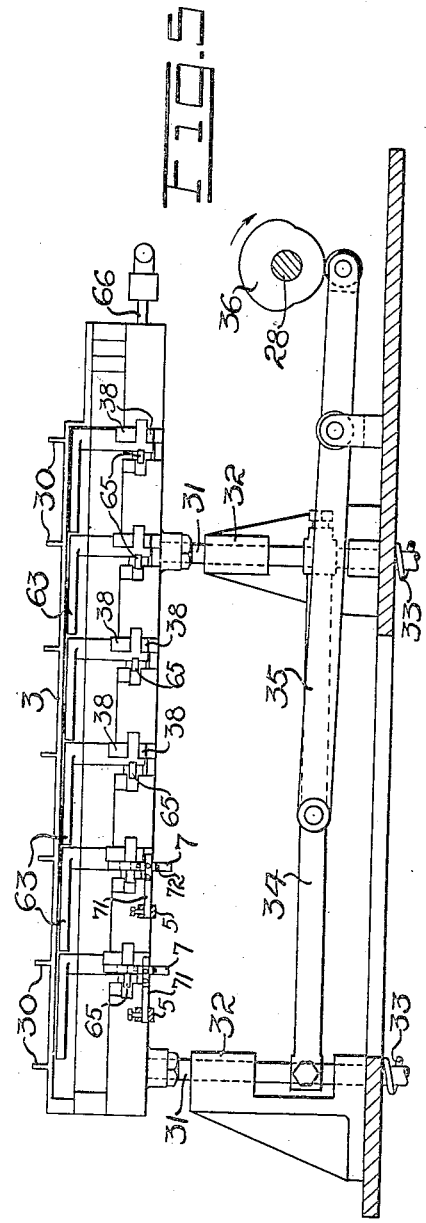

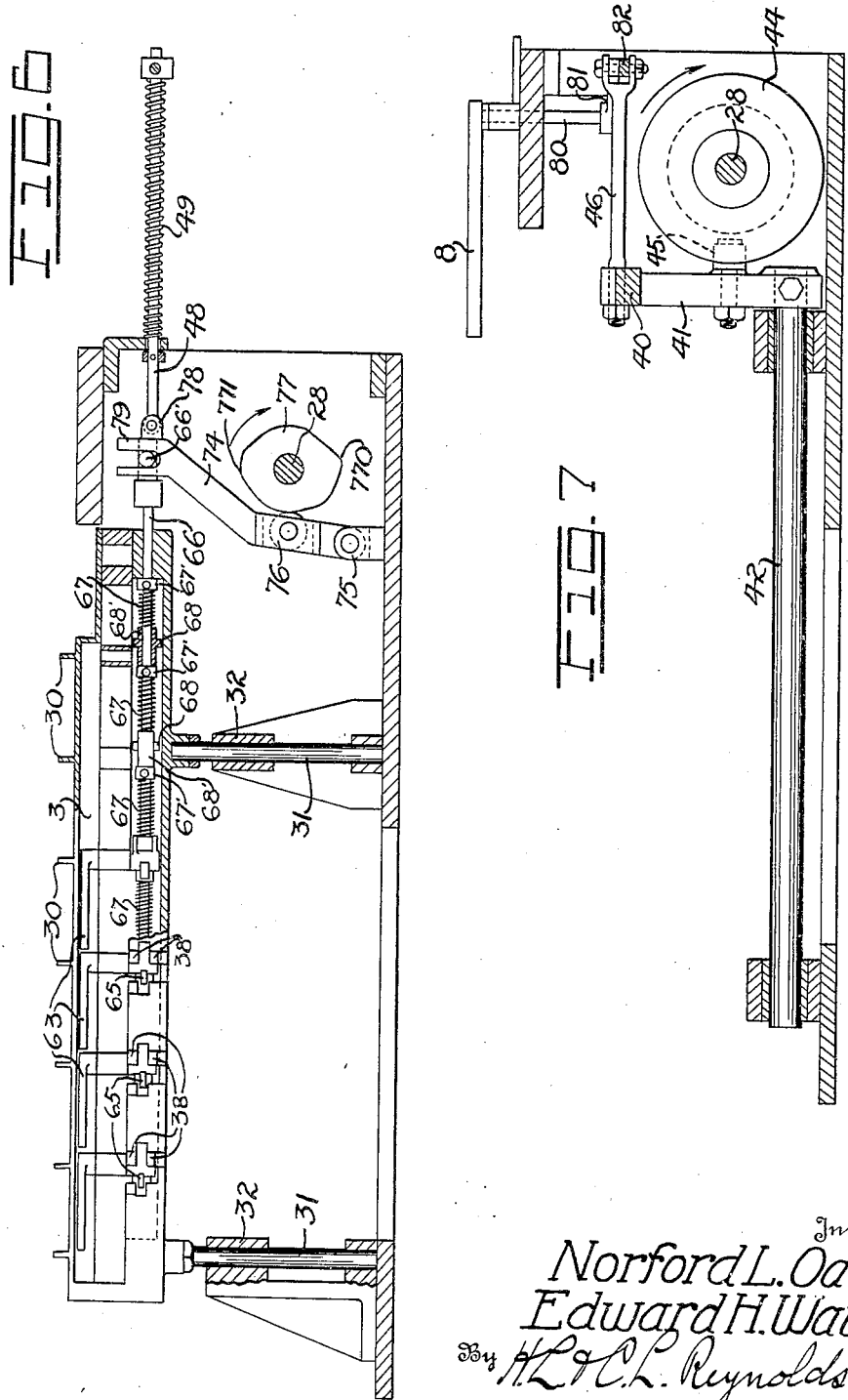

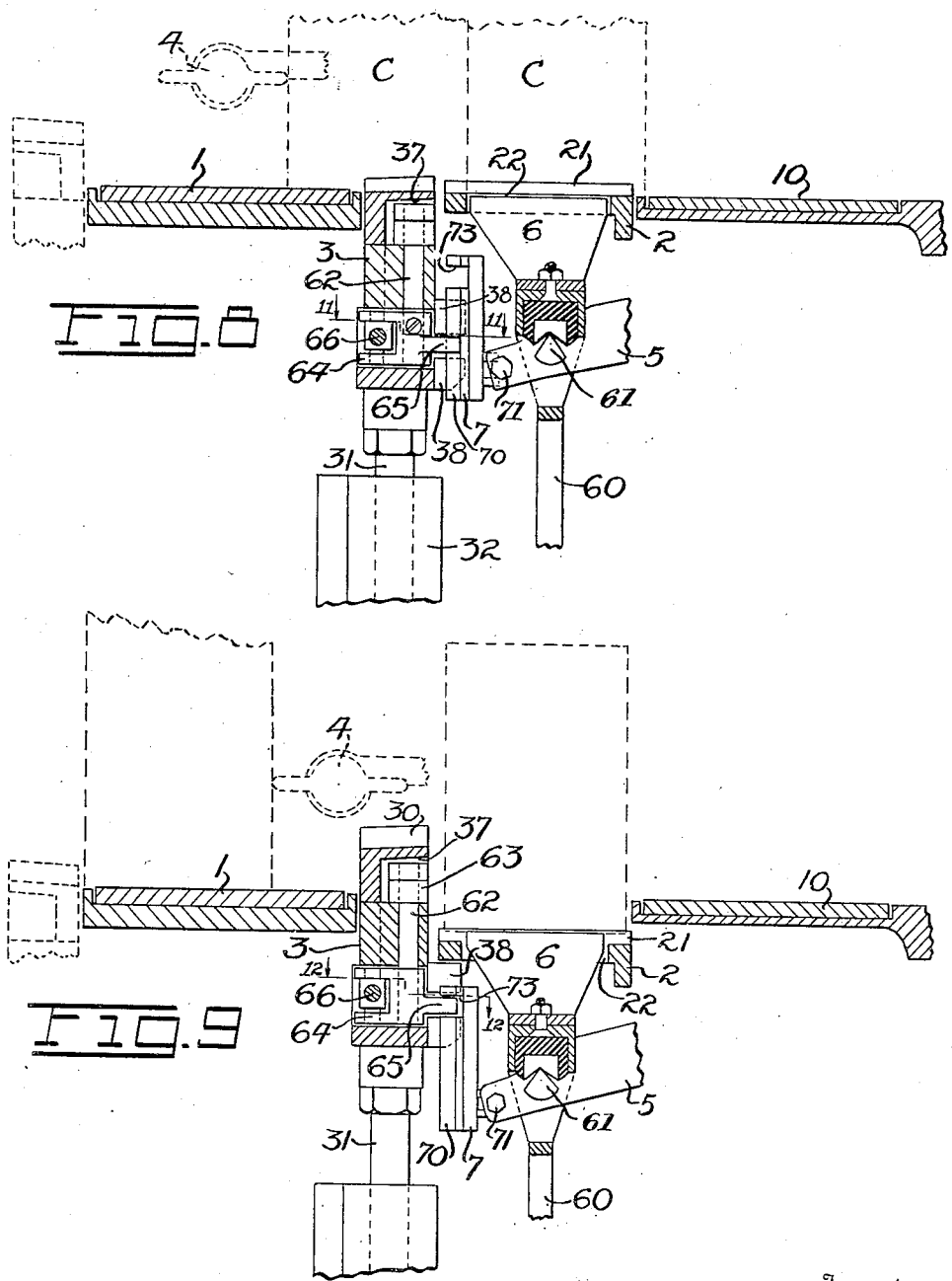

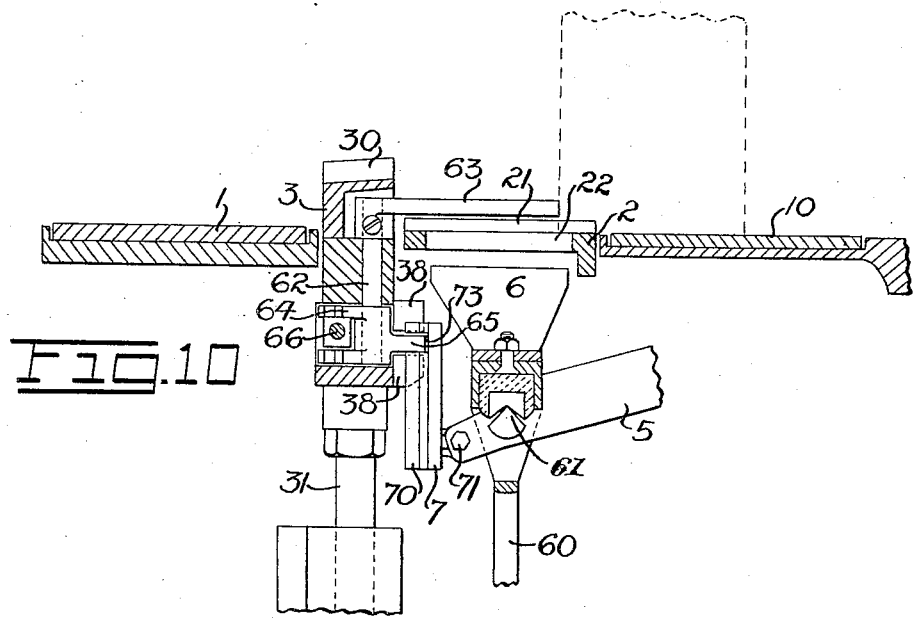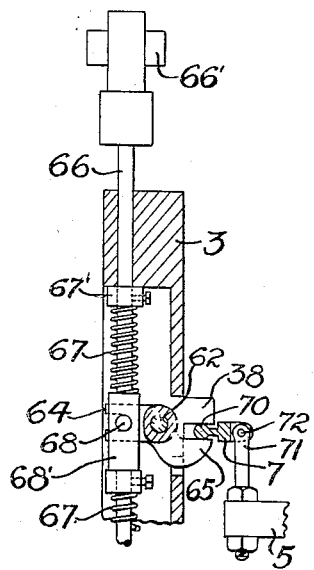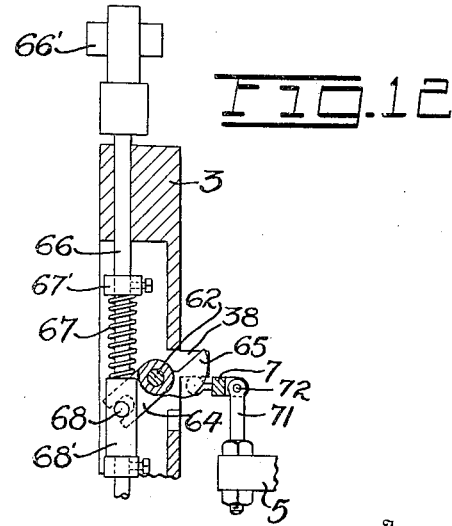

Patented Feb. 18, 1930

1,747,593

UNITED STATES PATENT OFFICE

NORFORD L. OATES AND EDWARD H. WAUGH, OF SEATTLE, WASHINGTON, ASSIGNORS TO SMITH CANNERY MACHINES CO., A CORPORATION OF WASHINGTON

CAN-WEIGHING MACHINE

Application filed December 7, 1927. Serial No. 238,283.

Our invention relates to weighing machines designed particularly for weighing packages or articles which are supposed to be all of a standard weight, for the purpose of separating from the others such packages or articles as fall short of the standard weight.

The object of our invention is the provision of a machine which will do this work accurately and dependably, and one having a large capacity, so that it may be capable of weighing the output of a large plant.

It is also our object to so handle a considerable number of articles or packages at one time that sufficient time may be used to move them gently and in such manner that the weighing may be done while the containers are open, thus preventing spilling of contents due to sudden or jerky movements, and by doing this before closing the containers, make it possible to supply enough material to the light containers to bring them up to standard weight.

Another object is to give enough time to the actual weighing of the containers to secure accurate results. Other objects will be disclosed by a study of the following description and the accompanying drawings and the novel features of our invention will be particularly pointed out in the claims.

In the accompanying drawings we have shown our invention embodied in the form which we now prefer.

Figure 1 is a top or plan view.

Figure 2 is a transverse section taken on the vertical plane indicated by the broken line 2—2 of Figure 1.

Figure 3 is a sectional plan view taken on the plane indicated by the broken line 3—3 of Figure 2.

Figure 4 is a side elevation and partial section illustrating the weighing scales and the means used for transferring the packages to the scales.

Figure 5 is a side elevation showing the construction and operation of the bar which is at times interposed between the scales and the can delivery belt.

Figure 6 is a side elevation, parts being in section, showing the means employed for separately removing from the weighing position of packages which are either over or under standard weight, depending upon the adjustment given the apparatus.

Figure 7 shows in side elevation and partial section the means for actuating the device for transferring packages to the weighing scales, and also for operating the fingers which guide the discharged packages in the right course.

Figures 8 and 9 show in transverse sectional elevation the weighing scales and the means employed in transferring the packages thereto from the supply belt, different positions being shown in the respective figures.

Figure 10 shows the same parts in another position, illustrating the discharge of the packages from the scales.

Figures 11 and 12 illustrate in sectional elevation the mechanism which automatically controls the discharge of the packages from the scales under the control of the weight thereof.

The machine as illustrated in the accompanying drawings and as it will be specifically hereinafter described, is one designed for weighing cans, and more specifically cans containing salmon. It is, however, evident that the same principles and methods of operation will apply to the weighing of any kind of canned or packaged material, and it is to be understood that any specific illustration or descriptive matter is given merely for convenience in setting forth the construction and principles involved in our invention, and that it is the intention to claim the invention as broadly as the state of the art will permit, and for any use to which it may be put.

Federal laws pertaining to the sale of packaged merchandise are very strict in demanding that the contents of each package shall be not less than represented. While it is possible in packaging certain products to accurately weigh the contents, this has been found impractical with many food products, such, for instance, as fish and vegetables, and at the same time secure volume and speed of action. Tests of a large number of cans of canned salmon have shown that a cannery having a season's output of 50,000 cases, on a conservative estimate, gives away in excess weight of fish which has been put in the cans to insure their all being not less than minimum weight, as much as $10,000.00 worth of fish, which could have been saved by the use of such a machine as ours.

To save as much as possible of this, while insuring that all cans shall be up to minimum weight, is the underlying idea of our invention. The general practice in the fish canning industry is to not weigh the cans at all, while the few which may be weighed are weighed only after they have been filled and sealed. It is then impossible to bring light weight cans up to standard weight. To prevent a few light weights, practically all of the cans are filled with a considerable excess weight. The plan of operation of our weighing machine contemplates weighing the cans after they are filled and before the covers are put on, so that it is a simple matter to add to the contents of the light weight cans, thereby avoiding any considerable excess weight in any cans and insuring all cans being up to minimum weight. It will be safe and feasible to place in the cans a more accurate weight of contents.

The cans are delivered to the machine by a belt 1 which, as shown in Figure 1, is moving continuously toward the right hand, as indicated by the arrow. Associated with this are belts 10, 11, these moving in the same direction and spaced from belt 1 at each side.

At each side of the central or delivering belt 1, and between it and the side belts 10 and 11, is a battery of weighing devices. I have shown six separate and independently operating weighing devices in each battery. The number may be anything within practical limits. By employing a battery of weighing devices to and from which the cans are simultaneously transferred, it is possible to make the transfer in a careful and slow manner, which will avoid any spilling of the contents and yet attain a large aggregate in a given time. By employing two batteries, one at each side of the receiving belt, the rate of action is further speeded up, as the transfer mechanism may be continuously acting.

The cans C which are being delivered by belt 1, are prevented from displacement by guard rails or bars 12, these being laterally adjustable to conform to the width of cans received. Detents or stops 13 and 14 are mounted for movement transversely of the belt and at points separated lengthwise of the belt enough to accommodate between them the number of cans which may be simultaneously weighed. These stops are oppositely moved in connection with an actuating lever 15, pivoted at 16. Springs, as 17, may also be employed.

One of the rods which carry the stops is connected with an actuating lever 18, better shown in Figure 3, and is intermittently operated to permit passage of not more than the right number of cans at a time to that portion of the belt 1 which is between the weighing devices.

The method of operating this lever illustrated consists of pivoting lever 18, connecting its lower end to a pivoted bell crank lever 25 which is actuated through a rod 26, in turn actuated by a cam 27 carried by the shaft 28, which shaft is connected through a gear train 29 with the shaft 24 which carries one set of the pulleys 23 over which the short belts 10 and 11 pass.

No provision is made for the actuation of the central belt 1 by the weighing machine. This is actuated by some outside source. This central belt may be an extension of the delivery belt from a filling machine, as it probably would be in a cannery line, and may also deliver the full weight cans to the capping or sealing machine. Any function performed by this belt, outside the limits of this machine, is immaterial to the present invention.

As the cans are advanced to the position between the weighing devices, they encounter a stop 20. They are also confined at the sides between a bar 3 at one side, which, at the time, projects above the belt, and the transfer bar 4, which is mounted above the level of the belt and is intermittently moved across the belt to sweep the cans upon the weighing devices. To permit this, the bar 3 is momentarily dropped.

The bars 3, of which there is one at each side of the belt, are each mounted upon two vertical rods 31, which reciprocate in guides 32, and are normally held down by gravity assisted, if need be, in prompt drop by springs 33, (see Figure 5). The rods 31 are connected by a bar 34, and this is centrally pivoted to a lever 35 which is actuated by a cam 36 carried by shaft 28. Each rod 3 has transverse guide ribs or flanges 30 on its upper surface adapted to engage the cans as they pass over it to guide the cans to the weighing devices. The ribs toward the ends of the series are slightly inclined, to thereby slightly separate the cans as delivered to the weighing devices.

The weighing devices are of the balance type, employing a lever 5, pivoted at 50, one end carrying can-supporting means, and the other, weights to balance the can. A fixed weight is shown as consisting of a yoke 51 supported on knife edge lugs 52 carried by bar 5 and having a downwardly extending guide rod or stem 53, and a supplemental weight 54. A link 55 connects the lower ends of rod 53, a rod 57 extending down from the fulcrum 50, and a like rod 60 extending downward from the parts 6, which receive and support the cans while being weighed. This is in effect a second scale beam. The bar 5 is provided with a knife edge lug 61 adapted to support the scale webs 6. Adjustable stops 58 may be set to limit the swing of the scale levers. Weights 56 screwing upon a threaded extension of the scale lever enable adjustment for widely differing weights of cans.

The weighing position of the cans has a receiving plate or bar 2, which has transverse partition webs 21 and transverse slots 22 for the passage of the can-supporting ribs or plates of the scales. This is, at suitable intervals, lowered to transfer the weight of the cans to the ribs 6 of the scales.

Each scale has two webs 6. Functionally considered, these may be any type of can supporting member which may pass through or by the plate or bar 2, so that when the bar 2 is dropped, the cans will be supported thereon. These webs lie in the holes 22 in bar 2, and are of a size and positioned so as to support the can when the bar 2 is dropped. By this expedient the can is first transferred to a supporting member having no supporting or actuating connection with the scales, which, by dropping, transfers the weight of the can to the scale with minimum shock. It is to be understood that the scale is to be adjusted so that the upper edges of webs 6 are substantially flush with but never above the upper surface of bar 2, and, therefore, already in contact with the can before the bar 2 is dropped. This condition is illustrated in Figures 2 and 8.

If now the bar 2 is dropped, the weight of the can is transferred without shock or blow to the supporting members 6 of the scale. Unless the can exceeds the weight for which the scale has been adjusted, the scale is not depressed. The difference in level of the cans which equal the minimum weight, and those which are less than such minimum, controls the direction of their future movement in a manner which will be hereinafter explained.

Alongside of the main or can-supplying belt 1 is the bar 3, which has, in its main features, been described. This bar carries a trip or transfer mechanism for each can being weighed. The selective control of these transfer devices is controlled by mechanisms which are carried partly upon the scale lever 5. Such transfer and control mechanism is duplicated for each can of the series being weighed. A description of one will be given.

Journaled in vertical position in the bar 3 is a small shaft 62. On its upper end is an arm 63, which normally extends lengthwise of the bar, and is seated in a recess 37 in said bar. A number of these arms are shown in Figure 1, in outwardly swung position, wherein they have moved their respective cans off of the scales and upon the short belt 11. No lever is shown in connection with one can of the group with which the others are shown. This can is one which is at the opposite side of the minimum weight from that of the other cans. It may be here said that the operation of the individual transfer arms may be adjusted to remove either the full weight cans, or the light weight cans, as desired.

Also secured to the pivot shaft 62 is a bell crank lever 65, shown in plan view in Figures 11 and 12. This lever has one arm 64 which has a pivot-like engagement with a reciprocable bar 66, as by a yoke end of arm 64 and a pin 68 carried by bar 66. A spring 67 on bar 66 normally holds these parts in the position wherein the transfer arm 63 is seated in its recess 37 of bar 3.

The other arm 65 of the bell crank lever swings between lugs 38 carried by bar 3, when the lever is rocked. The adjacent end of the scale lever 5 carries a complementary member which consists essentially of a bar or plate 7, extending vertically along and adjacent to the faces of lugs 38, and positioned to engage its integrally formed bead 70 with arm 65 to check or prevent swinging of the individual transfer arm 63, which is connected therewith, but movable by the vertical movement of the scale arm to release said arm 65 and permit swinging of the transfer arm 63. This may be done by providing a notch 73 of a width to accommodate the arm 65, and positioned to register with said notch, when the scale is depressed or when raised, depending upon whether the heavy or the light cans are discharged by said fingers. We have shown registration of arm 65 and the notch when the scale lever is depressed.

The plate or bar 7 is preferably mounted to swing slightly upon a vertical axis, as by pivoting it at 72 upon a supporting bar 71. This provides flexibility of adjustment to inaccuracies of position of parts co-acting therewith. For similar reasons I prefer to make its outer working edge as a rounded bead 70.

Each and all of the trip or releasing levers 64, 65 of a series or battery of weighing devices are operated from a common source. That illustrated employs a horizontal reciprocable rod 66 mounted upon the vertically-movable guard rail or bar 3. Springs 67 are interposed between collars 67' fixed to rod 66, and a sleeve or collar 68' loose on rod 66 and carrying the pin 68 which engages the arm 64 of the trip lever. The mechanism for reciprocating these rods is shown in Figure 6. The rod 66 has a transverse pin 66' entering a yoke 79 of a lever 74, pivoted at 75 and having a cam roller 76 engaging a cam on shaft 28. Lever 74 has lugs 78 to which is connected a rod 48 carrying a spring 49 acting to hold lever 74 up to the cam and also to return the rod 66.

The spring 49 is designed to be of such strength and to be so tensioned that it will normally dominate and overcome the action of all the springs 67 to thereby hold the rod 66 in the position wherein all the levers 64—65 are in position to free the scale, or as shown in Figure 11.

The cam 77 by which rod 65 is reciprocated, has two high points, 770 and 771 both of which are brought into action in a complete cycle of movement. This causes a double reciprocation of rod 66. The first reciprocation occurs to cause the ends 65 of all the locking levers to press against the side of the ribs 70 to thereby frictionally hold them against downward movement, this occurring as the can is put in place upon the scale pan 6. The purpose of this is to provide a frictional resistance sufficient to hold the scale arms against any vibrating tendency induced by the application of the cams thereto. This pressure is released by the return movement of rod 66, at the time the plate 2 is lowered, thus freeing the ribs 70 and permitting the scales to descend, if the weight of the can is up to or above standard. The second reciprocation of rod 66 occurs after the scale pans have been depressed. This movement throws the ends 65 of the locking levers into the notches 73 of the webs 7 which permits rocking of their shafts 62 and the swinging of the kick-off fingers 63 to thereby move the cans from the plate 2 to the belt 10. All light weight cans fail to depress the scale pan and therefore the notch 73 is not in registry with the lever end 65 and consequently its kick-off finger will not operate. Such cans are later pushed off the plate by the corresponding can of the next set as they are slid upon the plate 2.

At the discharge end of the machine, switch fingers 8 are mounted upon vertical shafts 80 and periodically swing into the positions shown in solid and in dotted lines in Figure 1, to thereby send the weighed cans back to belt 1 for further conveyance elsewhere, or passed on to be deflected by bars 83 or otherwise disposed of. The operation of these are timed to properly fit with the transfer of the standard and of the light weight cans.

Carried by the upper end of the swinging vertical arm 41 is a goose-neck arm 40, which extends above the table and carries a bar 4, shown in plan in Figure 1 and in end elevation in Figure 2, which bar is swung across the machine to transfer cans from belt 1 to the weighing scales, and by doing this, to push off the scales such cans as have not been unmoved by the individual arms 63. The movement of this transfer arm is so slow and gradual that there is no danger of spilling the contents of the cans, although they are uncovered and contain liquids. Capacity is attained in the present machine by weighing several cans at a time and by using a series of weighing devices at each side of the belt.

In operation the cans are received upon the belt 1, the movement being towards the right hand in Figure 1. The stops 13 and 14 are operated alternately to permit passage to the loading position of the number of cans which the machine is designed to weight at one time, this being six in the machine illustrated.

At this time the transfer bar 4 is at one side of the row of cans. This bar is caused to swing slowly across the loading position, sliding the entire set of cans C laterally and upon the can-receiving end of the scales. While this is being done, the guard bar 3 at this side of the loading position is depressed to the position shown in Figure 8. Its position at other times is as shown in Figures 9 and 10. These two positions are shown by the respective bars in Figure 2. The guard bars 3, as well as the platform bars 2, have cross ribs 30 and 21, which slightly separate the cans of the row, so that there will be no frictional contact between them while being weighed.

At the time of transfer of the cans to the weighing devices, the platform bar 2 is raised so that its can-receiving surface is flush with or just above the upper can-supporting edges of the webs 6, which webs are in effect the weight-receiving pan of the scale.

To secure speed of operation together with accuracy it is desirable that vibrations in the scales at the time of transferring the weight to the scale pan be prevented. This is in considerable measure contributed by having the upper edges of the webs 6 at exactly or substantially the level of the receiving and supporting plate 2. Under such a condition, when the plate 2 is lowered, the cans have at the most only a minute distance to go to where they are supported entirely upon the scale pan (webs 6) and therefore their weight has a static effect and not a dynamic effect wherefore it follows that a minimum vibratory effect is produced in the scales. It is not intended to rely solely upon such action to steady and check vibrations of the scales, the gripping action of fingers 65 upon bead 70 being retained.

The removal of the cans from the scales by the individual devices, carried by the guard bars 3, effected by the swinging of the fingers 63, occurs only when the scale is at the level wherein the notch 73 in the web 7 coincides in level with the end 65 of the bell crank lever carried by the shaft 62, which shaft also carries arm or finger 63. The swinging effort applied to these parts is applied through the springs 67 and is timed to coincide with the depressed position of those scales which have thereon cans which equal or exceed the minimum allowable weight. For such cans the "kick-off" fingers or arms 63 are pressed against them with sufficient force to slide them off of their supports, but this cannot happen until the bar or plate 3 is raised to such a level as to bring the cans above the short belt 10 or 11, as the case may be. The raising of bar 3 precedes the removal of the actuating effort from the springs 67, due to withdrawal of bar 66. Whatever cans are left unremoved from the bar 2 are removed by the cans of the next series when moved upon the scales. Between these periods the switch fingers 8 are swung, so that the full weight cans go one way and the light weight cans the other.

Attention is desired to be called to the fact that by placing the notch 73 lower upon the web 7, or where it will coincide in level with the level of fingers 65 at the upper position of the scales, the operation of the machine may be varied from that described, so that the light weight cans only are removed by the kick-off fingers 63, while the full weight and overweight cans are removed by the next set of cans as they are transferred to the scales. In the construction illustrated, the fingers 65 by entering the notch 73 in web 70 prevent rising of the scale when the bar 2 rises. In the other manner of operation, the locking of the scales by fingers 65 would occur at their upper level.

What we claim as our invention is:

1. In a package-weighing machine, two series of weighing devices disposed alongside and at opposite sides of a station each adapted to receive a series of aligned packages, means for simultaneously transferring successive series of aligned packages as a body from said receiving station to the weighing devices in alternation.

2. In a package-weighing machine, two groups of independently-acting weighing devices disposed at opposite sides of a package-receiving station, means associated with each group of weighing devices for supporting the packages at the time of transfer of the packages thereto, and means for removing said package-supporting means from the packages after they are in place upon the weighing devices.

3. In a weighing machine, a series of scales each adapted to receive and weigh its individual package, a package-supporting member adapted to support all the packages of the series as they are placed upon the scales, and means for withdrawing the said supporting member from the packages after the packages have been placed upon the scales.

4. In a package-weighing machine, a weighing device adapted to weigh a single package at a time, and means for independently supporting the package after it has been placed upon the weighing device, said weighing and supporting devices having parts adapted to simultaneously engage the package from below without interference, and means for lowering said supporting device after the package has been positioned upon the weighing device.

5. In a can-weighing machine, a series of weighing devices disposed in a row, a preliminary receiving means for a series of cans located alongside of the said row of weighing devices and a single transfer member for simultaneously transferring all the cans of a series from the receiving means to the weighing devices.

6. In a can-weighing machine, a series of weighing devices disposed in a row, a preliminary can-receiving means located alongside of the said row of weighing devices, means for simultaneously transferring the cans from the receiving means to the weighing devices, and means for temporarily supporting the cans independently of the weighing and the transferring means when first transferred to the weighing position.

7. In a can-weighing machine, a runway adapted to receive a can-delivering belt, a guard bar at each side of said runway, means for vertically moving said guard bars between a position which is above the level of said runway and a position which is flush with said runway, a series of can-weighing devices just outwardly of and alongside each guard bar, and a transfer bar extending lengthwise of said runway and periodically movable laterally across said runway to move the can from said runway to said weighing devices in alternation.

8. In a can-weighing machine having a central runway and means for delivering a determined number of cans thereto at a time, two sets of weighing devices located at opposite sides of said runway, each set corresponding in number with the number of cans delivered at a time to the runway, a transfer bar and means for moving it transversely of and over said runway to transfer the cans from the runway to the weighing devices in alternation, and independently-operable means for discharging the cans from the weighing devices controllable in time of action by the weight of the individual can.

9. In a can-weighing machine, a series of can weighing devices, means for simultaneously transferring a can to each of said weighing devices, an independently operable can-removing device for each weighing device, and means for controlling the operation of said can-removing devices by the weight of the can being weighed.

10. In a can-weighing machine, two series of weighing devices disposed in separated parallel rows, a loading zone extending between said rows, a guard bar between the loading zone and each row of weighing devices, means for depressing said bars to permit sliding of the row of cans from the loading zone upon the weighing devices, and means controlled in operation by the weight of the can, for removing the cans from the weighing devices.

11. In a can-weighing machine, two series of weighing devices disposed in separated parallel rows, a loading zone extending between said rows, a guard bar between the loading zone and each row of weighing devices, means for depressing said bars to permit sliding of the row of cans from the loading zone upon the weighing devices, and separate can-removing devices for each weighing device carried by said guard bars, and means for controlling the action of said can-removing devices by the weighing devices.

12. In a can-weighing machine, means for delivering a series of cans in aligned relation to a transfer point, two series of individual can-weighing devices arranged at opposite sides of said transfer point, a transfer bar, and means for moving said transfer bar laterally across said transfer point to move the series of cans thereon to the weighing devices in alternation.

13. In a package weighing device, a package receiving station adapted to receive a series of aligned packages, two corresponding series of weighing devices located at respectively opposite sides of the receiving station, a transfer bar and means for moving said bar across said receiving station while maintaining parallelism of position to thereby simultaneously transfer a series of packages to said weighing devices in alternation.

14. In a package weighing machine, a transfer bar and means for giving said bar a sidewise movement while maintaining parallelism of its acting surface with that of an aligned series of packages to thereby simultaneously transfer a series of packages from a receiving station to weighing devices.

15. In a package weighing machine, a package receiving and transfer station adapted for the simultaneous transfer of an aligned series of packages, a transfer bar extending lengthwise of said station and means for moving said bar sidewise over the transfer station to thereby transfer a series of packages in alternation to opposite sides of the transfer station.

16. In a package weighing machine, a package receiving and transfer station adapted for the simultaneous transfer of an aligned series of packages, a transfer bar extending lengthwise of said station and carried by an arm pivoted to swing upon an axis which is parallel with and vertically spaced from the transfer bar, and means for swinging said bar across the transfer station.

Signed at Seattle, King County, Washington, this 30th day of November, 1927.

NORFORD L. OATES.
EDWARD H. WAUGH.